UNITED STATES PATENT OFFICE.

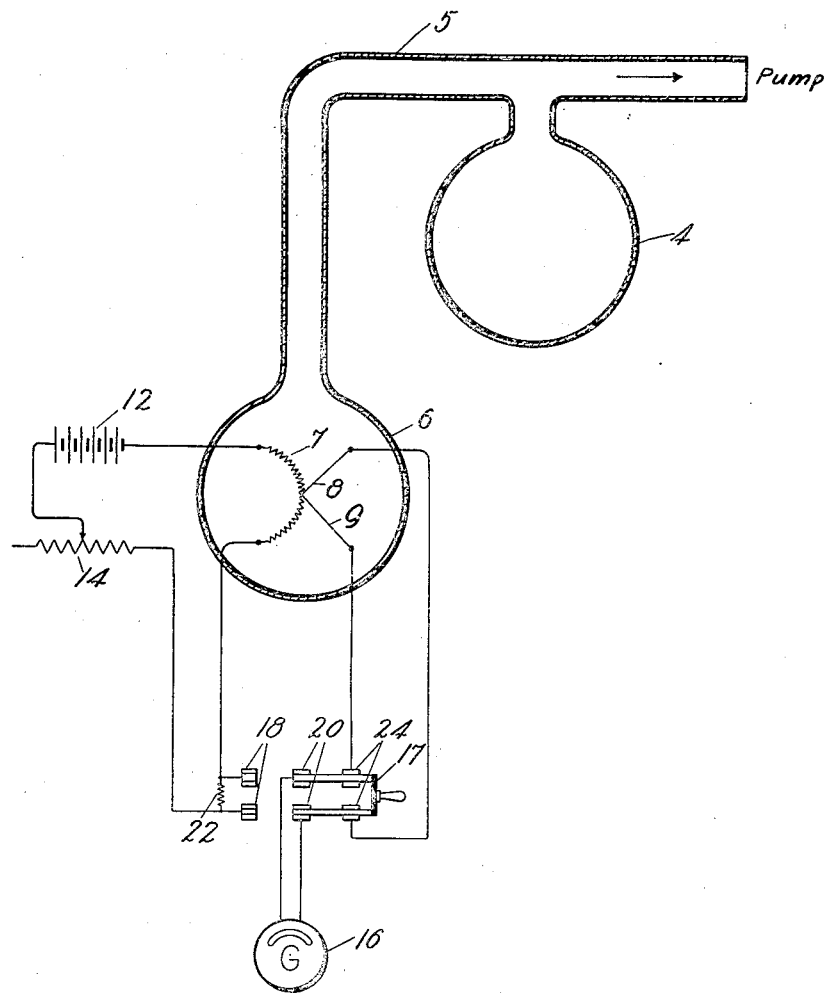

JOSEPH T. BUTTERFIELD, OF HAWTHORNE, NEW JERSEY, ASSIGNOR TO WESTERN ELECTRIC COMPANY, INCORPORATED, OF NEW YORK, N. Y., A CORPORATION OF NEW YORK.

APPARATUS FOR MEASURING GAS-PRESSURES.

1,381,450.     Specification of Letters Patent.     Patented June 14, 1921.

Application filed July 14, 1917. Serial No. 180,686.

*To all whom it may concern:*

Be it known that I, JOSEPH T. BUTTERFIELD, a citizen of the United States, residing at Hawthorne, in the county of Passaic and State of New Jersey, have invented certain new and useful Improvements in Apparatus for Measuring Gas-Pressures, of which the following is a full, clear, concise, and exact description.

This invention relates to a method and apparatus for measuring gas pressures, and in particular for measuring minute pressures, such as are present in vacuum tubes employed as electric lamps.

Its object is to provide a more convenient method than has hitherto been employed for measuring such pressures. A further object is to provide for the continuous indication of said pressures.

In the preferred form of this invention, means, such as a high resistance heated by a source of current, is inserted in the vacuum to be measured, for producing heat therein preferably at a constant rate. A suitable means, such as a thermo-couple, is provided for determining the temperature of the resistance. The temperature to which this resistance is raised by the current flow will depend upon the relative amount of heat radiated into space and the amount conducted away by the lead wires and by the particles of air surrounding the resistance. The amount lost by radiation and the amount conducted away by the lead wires will for a given temperature, be independent of the degree of the evacuation of the vessel containing the thermo-couple. But the amount of heat conveyed, or carried away, by the air particles, that is, by convection, as this term is herein used, will, of course, be dependent upon the number of particles present in a unit volume of the vessel. If, therefore, a constant current is supplied to said resistance, the temperature of said resistance and, therefore, the thermo-electro-motive force developed will be dependent upon the degree of evacuation of the vessel.

For a better understanding of this invention, reference is made to the following detailed description taken in connection with the accompanying drawing, which illustrates one embodiment of this invention.

In the drawing, 4 represents a vessel, the gas pressure of which is to be measured. A connecting tube 5 extends from this vessel to a vessel 6, in which is inclosed a resistance 7, and a thermo-couple composed of the two elements 8 and 9. Current to heat the resistance 7 is supplied by the battery 12, the amount of which current may be controlled by the variable resistance 14. A suitable galvanometer 16 or other indicating instrument is connected in series with the thermo-couple.

In the operation of the device the double pole switch 17 is thrown to make contact between the terminals 18 and 20, and the resistance 14 is adjusted until the drop of potential across the small resistance 22 gives the desired reading in the instrument 16. The switch may then be thrown to make contact between the terminals 20 and 24, thereby putting the galvanometer in electrical connection with the thermo-couple. The reading of the galvanometer 16 will depend on the amount of the evacuation in the vessel 4, provided the current through resistance 7 remains constant. This constancy may be checked, when desired, by throwing the switch 17 to make contact between the terminals 18 and 20, and ascertaining whether the reading of the galvanometer is the same as its original value.

It is apparent that having calibrated the device for various known values of pressure in the evacuated vessel the scale of the measuring instrument may be made to read in any desired system of units.

The heated element should preferably be of some high resistance material having a negligibly small temperature coefficient of resistance such as nichrome manganin or the like. Iron and the alloy known as "prima-prima" form a satisfactory thermo-couple for this use. However, any suitable heated element and thermal elements may be employed.

What is claimed is:

1. The method of determining gas pressures within a vessel which comprises producing heat at a substantially constant rate at a point in said gas, diverting a portion of said heat, and measuring the diverted portion in terms which permit of the deduction therefrom of the pressure.

2. The method of determining the pressure of a gas within a vessel which comprises producing heat at a substantially constant rate at a point in said gas, diverting a portion of this heat, transforming into a different form of energy the heat energy thus diverted, and measuring the transformed energy in terms which permit of the deduction therefrom of gas pressure.

3. The combination with a vessel, of apparatus for determining the pressure within said vessel, said apparatus comprising a heated element having a temperature co-efficient of resistance substantially as low as zero, and a thermo-couple, said heated element and said thermo-couple being subjected to the pressure in said vessel, and said apparatus also comprising means for electrically heating said element, said thermo-couple being adapted to receive heat from said heated element, whereby changes in the temperature of said element may be measured.

4. The combination with an evacuated vessel, of apparatus for determining the pressure within said vessel, said apparatus comprising a second vessel communicating with the first vessel and containing a thermo-couple, and an element adapted to supply heat to said thermo-couple, means for electrically heating said element, and means for measuring the thermo-electromotive force generated by said thermo-couple, said element having a temperature co-efficient of resistance substantially as low as zero.

5. The combination with an evacuated vessel, of apparatus for determining the pressure within said vessel, said apparatus comprising a second vessel communicating with the first vessel and containing a heated element and a thermo-couple, the thermal junction of which is connected to said element, means for electrically heating said element, and a measuring instrument connected to said thermo-couple, said element having a temperature co-efficient of resistance substantially as low as zero.

6. The combination with an evacuated vessel, of apparatus for determining the pressure within said vessel, said apparatus comprising a second vessel communicating with the first vessel and containing a resistance and a thermo-couple, the thermal junction of which is connected to said resistance, means for electrically heating said resistance, and a measuring instrument connected to said thermo-couple, said resistance having a temperature co-efficient of resistance substantially as low as zero.

7. The combination with an evacuated vessel, of a pair of lead wires extending into said vessel, a homogeneous resistance element, having a temperature co-efficient of resistance substantially as low as zero, connected to said wires within said vessel, means for supplying electric current to said lead wires, and means for measuring in terms which permit of the deduction therefrom of gas pressure, the amount of heat lost by said resistance due to pressure variations within the vessel.

8. A pressure-measuring device comprising a containing vessel adapted to have internal pressures of any value, a resistor, having a temperature co-efficient of resistance substantially as low as zero, within said containing vessel, thermal responsive means associated with said resistor, and means for indicating the response of said thermal responsive means in terms which permit of the deduction of the pressure within said vessel.

In witness whereof, I hereunto subscribe my name this 12th day of July, A. D. 1917.

JOSEPH T. BUTTERFIELD.